(12) United States Patent
Liu et al.

(10) Patent No.: US 9,462,611 B2
(45) Date of Patent: Oct. 4, 2016

(54) METHOD AND APPARATUS FOR MTC DEVICE ACCESSING WIRELESS COMMUNICATION SYSTEM

(71) Applicant: ZTE Corporation, Shenzhen, Guangdong (CN)

(72) Inventors: Junqiang Liu, Shenzhen (CN); Xiang Cheng, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 14/424,318

(22) PCT Filed: Aug. 7, 2013

(86) PCT No.: PCT/CN2013/081017
§ 371 (c)(1),
(2) Date: Feb. 26, 2015

(87) PCT Pub. No.: WO2014/036875
PCT Pub. Date: Mar. 13, 2014

(65) Prior Publication Data
US 2015/0230272 A1  Aug. 13, 2015

(30) Foreign Application Priority Data

Sep. 7, 2012 (CN) .......................... 2012 1 0330276

(51) Int. Cl.
*H04W 74/08* (2009.01)
*H04W 48/06* (2009.01)
(Continued)

(52) U.S. Cl.
CPC ......... *H04W 74/0833* (2013.01); *H04W 24/02* (2013.01); *H04W 28/0278* (2013.01); *H04W 48/06* (2013.01); *H04W 48/10* (2013.01); *H04W 72/0486* (2013.01)

(58) Field of Classification Search
CPC ........... H04W 24/02; H04W 28/0278; H04W 48/06; H04W 48/10; H04W 72/0486; H04W 74/0833; H04W 28/00; H04W 28/02; H04W 28/0205; H04W 28/0215; H04W 28/0273; H04W 28/0284; H04W 28/0289; H04L 47/10; H04L 47/30; H04L 47/722; H04L 12/1489; H04L 2012/5678; H04L 2012/5681; H04L 2012/6489; H04L 1/1835

USPC ................. 370/252, 328, 338, 329, 464–465
See application file for complete search history.

(56) References Cited

U.S. PATENT DOCUMENTS 8,780,810 B2 * 7/2014 Ryu .................. H04W 74/0833
370/328
9,125,137 B2 * 9/2015 Kim ...................... H04W 48/10
(Continued)

FOREIGN PATENT DOCUMENTS

CN 102300285 A 12/2011
CN 102348254 A 2/2012
(Continued)

OTHER PUBLICATIONS

Supplementary European Search Report in European application No. 13835303.2, mailed on Aug. 28, 2015.
(Continued)

*Primary Examiner* — Warner Wong
(74) *Attorney, Agent, or Firm* — Oppedahl Patent Law Firm LLC (57) ABSTRACT

Disclosed are a method and apparatus for MTC device accessing wireless communication system. The method comprises: after the access network element obtaining the limited factor of the queue length, the normal access rank MTC device obtaining the corresponding limited factor of the queue length by monitoring the broadcasting channel; the MTC device calculating the queue length of its buffer, and judging whether the extending access barring EAB process can be performed according to the calculated queue length of its buffer and the obtained limited factor of the queue length; if not, continuing obtaining the corresponding limited factor of the queue length by monitoring the broadcasting channel; if yes, performing the EAB process, and determining whether random access process to the wireless communication system can be initiated according to the performance result of the EAB process. Applying the invention, the overflow of the buffer can be avoided, which is resulted from that the MTC device with large traffic can not access the network.

20 Claims, 5 Drawing Sheets

(51) Int. Cl.
*H04W 24/02* (2009.01)
*H04W 28/02* (2009.01)
*H04W 48/10* (2009.01)
*H04W 72/04* (2009.01)

(56) References Cited

U.S. PATENT DOCUMENTS

| | | | |
|---|---|---|---|
| 9,253,710 B2* | 2/2016 | Kim | H04W 48/06 |
| 2011/0199898 A1* | 8/2011 | Cho | H04W 48/06 370/230 |
| 2011/0199905 A1* | 8/2011 | Pinheiro | H04W 4/005 370/235 |
| 2011/0201307 A1* | 8/2011 | Segura | H04W 48/02 455/411 |
| 2011/0300858 A1 | 12/2011 | Lee | |
| 2012/0040643 A1* | 2/2012 | Diachina | H04W 4/005 455/411 |
| 2012/0269122 A1* | 10/2012 | Lee | H04W 76/066 370/328 |
| 2013/0039309 A1* | 2/2013 | Chiu | H04W 74/0833 370/329 |
| 2013/0040597 A1* | 2/2013 | Jang | H04W 48/02 455/404.1 |
| 2013/0040605 A1* | 2/2013 | Zhang | H04W 48/06 455/411 |
| 2013/0044702 A1* | 2/2013 | Jayaraman | H04W 48/06 370/329 |
| 2013/0051325 A1* | 2/2013 | Ryu | H04W 74/0833 370/328 |
| 2013/0121225 A1* | 5/2013 | Ryu | H04W 52/0229 370/311 |
| 2013/0122906 A1* | 5/2013 | Klatt | H04W 48/02 455/435.1 |
| 2014/0036669 A1* | 2/2014 | Yang | H04N 21/2365 370/230 |
| 2014/0080531 A1* | 3/2014 | Du | H04W 74/006 455/509 |
| 2014/0120938 A1* | 5/2014 | Widell | H04L 5/003 455/453 |
| 2014/0126508 A1* | 5/2014 | Young | H04W 4/005 370/329 |
| 2014/0171096 A1* | 6/2014 | Hwang | H04W 48/02 455/452.1 |
| 2014/0206373 A1* | 7/2014 | Ljung | H04W 72/14 455/452.1 |
| 2014/0307720 A1* | 10/2014 | Koslela | H04W 48/02 370/336 |
| 2016/0050615 A1* | 2/2016 | Fong | H04W 48/12 455/411 |

FOREIGN PATENT DOCUMENTS

| | | |
|---|---|---|
| CN | 102612113 A | 7/2012 |
| JP | 2011135800 S | 11/2011 |
| JP | 2012093583 S | 7/2012 |

OTHER PUBLICATIONS

MTC Time Tolerant Feature, mailed on Feb. 16, 2010.
System Improvements for Machine-Type Communications (Release 11), mailed on Aug. 17, 2012.
International Search Report in international application No. PCT/CN2013/081017, mailed on Nov. 14, 2013.
English Translation of the Written Opinion of the International Search Authority in international application No. PCT/CN2013/081017, mailed on Nov. 14, 2013.

* cited by examiner

201. after an access network element (NE) acquires a queue limiting factor, an MTC device of a common access level acquires a queue limiting factor corresponding to the common access level by monitoring a broadcast channel 202. the MTC device computes a local buffer queue length; determines, according to the computed local buffer queue length and the acquired queue limiting factor, whether extended access barring (EAB) can be performed; when EAB cannot be performed, executes step 201; when EAB can be performed, executes the EAB, and determines, according to a result of executing the EAB, whether to initiate mobile communication system random access

Fig. 3

| buffer state parameter | corresponding buffer traffic percent range |
|---|---|
| 0 | [0%, 10%) |
| 1 | [10%, 20%) |
| 2 | [20%, 30%) |
| 3 | [30%, 40%) |
| 4 | [40%, 50%) |
| 5 | [50%, 60%) |
| 6 | [60%, 70%) |
| 7 | [70%, 80%) |
| 8 | [80%, 90%) |
| 9 | [90%, 100%] |

Fig. 4

```
SysInfoType21 ::=                    SEQUENCE {
extAccessBarringParam-CS-Domain      ExtAccessBarringParam      OPTIONAL,
extAccessBarringParam-PS-Domain      ExtAccessBarringParam      OPTIONAL,
extAccessBarringParamCommon          ExtAccessBarringParam      OPTIONAL,
nonCriticalExtensions                SEQUENCE {}                OPTIONAL
}

ExtAccessBarringParam ::=            SEQUENCE {
roamingCategory                      ENUMERATED {a, b, c },
restriction                          EAB-AccessClassBarredList OPTIONAL
}

EAB-AccessClassBarredList::=         SEQUENCE (SIZE (10)) OFAccessClassBarred
```

Fig. 5

| information element | demand | association | type /reference | semantic description |
|---|---|---|---|---|
| QueueLimitedFactor List | | | | each common access level (0~9) corresponds to a queue length related factor (an integer of 0~9) |

METHOD AND APPARATUS FOR MTC DEVICE ACCESSING WIRELESS COMMUNICATION SYSTEM

TECHNICAL FIELD

The disclosure relates to field of mobile communication, and in particular to a method and apparatus for accessing a mobile communication system by a Machine-Type Communication (MTC) device.

BACKGROUND

In related art, the concept of Internet of Things is first proposed at an international mobile computing and network conference held 1999 in the United States. In short, an Internet of Things is a network connecting things. There are two meanings. First, an information provider and an information user are extended from humans gradually to physical entities. Objects communicate and exchange information with each other through the Internet of Things. Secondly, interconnection among physical entities is implemented through various wireless or wired, long-distance or short-distance communication networks, communication and transmission thereof requiring no or limited manual intervention.

Machine to Machine (M2M) communication or Man to Machine (M2M) communication mainly refers to information delivery through a network to implement Machine to Machine or Man to Machine data exchange, i.e. machine interconnection implemented through a communication network.

Compared with Human to Human (H2H) communication, a market for M2M communication is larger. A number of M2M communication terminals is by far greater than that of H2H communication terminals. By inter-ting communication, smart information delivery among a vast amount of machines in the human world may be implemented. Machine to machine communication brings new opportunities and challenges to the entire communication industry and the entire world.

Due to particularity of a mobile communication network, at a terminal side, manual wiring is not required, mobility support may be provided, which facilitate cost saving, and may meet a communication demand in a hazardous environment, such that an M2M service borne on a mobile communication network obtains broad attention in the industry.

With mobile communication technology as a core work, 3rd Generation Partnership Project (3GPP)/3GPP2 focuses on network optimization for Internet of Things traffic to be implemented and provided in a 3rd Generation (3G), Long Term Evolution (LTE), also known as Code Division Multiple Access (CDMA) network. The study relates to fields such as a traffic demand, optimization of a core network and a wireless network, security, etc. M2M within 3GPP is known as MTC. MTC relates to one or more forms of data communication of entities requiring no human interference. MTC service optimization differs from H2H service optimization. MTC differs from communication traffic of a mobile network at present, with features distinguished from those of H2H traffic, namely, a large number of terminals, low mobility, delay insensitivity, a low transmission frequency, etc. In addition, MTC traffic is characterized by Mobile Originate Only, that is, traffic is initiated by an MTC device most of the time.

At present, in MTC communication architecture provided in 3GPP, an MTC server and a Radio Access Network (RAN) may exchange information through an interface MTCsp. An MTC server and an MTC Application may exchange information through an API interface. A wireless access network and an MTC device may interact through an interface MTCu. An interface MTCu may provide a way for an MTC device to access a 3GPP network to deliver user-plane and control-plane traffic. Refer to MTCu/MTCsp/API in 3GPP TR 23.888 v1.6.1, section 6.38.2 for the MTC communication architecture.

As there may be an excessively large number of MTC devices, plus a large number of MTC devices may have to be deployed in a specific area, in a traffic burst, at some point a large number of devices may request to access a wireless network simultaneously, which will lead to simultaneous transmission of a lot of wireless data and signaling, causing access network congestion. Once congestion occurs, intolerable delay, packet loss, or even service unavailability may result. This only will negatively impact the MTC traffic, but also will impact quality of communication of a conventional user. Therefore, for a current network, there is a pressing need for strengthening access network congestion control. A mechanism for ensuring network availability, and means helping a network reach a demand of an MTC device to network performance, have to be found.

To avoid random access congestion caused by simultaneous access by a large number of MTC devices, an access time of an MTC device may be controlled via an application layer. For example, in smart meter reading traffic, simultaneous traffic report by a large number of smart water/electricity meters may be avoided by setting different reporting times in an application layer. However, in future M2M application, there may be a large number of industry applications, which may not be fully operator-controlled, or may not understand the nature of a cellular network, Therefore, such an application will not consider setting application-layer access time control from a perspective of network utilization. In a scene such as earthquake prediction, a large number of sensors have to report alert information within a very short period of time, and a network has to be able to simultaneously process a large number of information reports. Therefore, a method for MTC device access time control for a wireless side also has to be found. Such a solution is transparent to an application layer. A network may handle simultaneous access by a large number of MTC devices with ease, even if no corresponding access time control is set at an application layer.

After the 3GPP TSG RAN2#73 conference, it is decided to avoid MTC overload in a RAN using Extended Access Barring (EAB) in Selective Availability (SA) as baseline. The EAB may include an access control class. A wireless network will broadcast a new an EAB parameter while broadcasting an existing ACB parameter. A terminal configured with EAB will monitor EAB information in system broadcast.

As an improved solution, EAB may allow a network to selectively control an access request from "a device configured with EAB" (with higher tolerance to access barring than other UEs) to prevent access network and core network overload. Thus, no new Access Class is required. In case of congestion, a network may reject an access request from "a device configured with EAB" while allowing access by other UEs. When determining that EAB is right, a network will broadcast necessary information through a BCCH to provide a UE with EAB control. When multiple core networks share one access network, EAB information may be embodied by a Public Land Mobile Network (PLMN).

In the 3GPP TSG RAN2#77 conference, companies reach an agreement on how to broadcast an EAB parameter, i.e., in both a Universal Mobile Telecommunications System (UMTS) and an LTE system, EAB information may be contained in an additional System Information Block (SIB).

EAB in UMTS may be execute as follows. Before an MTC device initiates an access request, first a parameter p (0<p<1) may be broadcast by an access NE. After receiving the p, a device under the access NE will locally generate another parameter q (0<q<1). When q<p, the device may initiate a subsequent access process; otherwise the device will not attempt access. As proposed at present, an access NE may determine the p based on a number of connected users. That is, the more connected users there are, the smaller the p will be set, so as to reduce a number of users who will attempt access to avoid congestion.

However, from the perspective of an MTC device, such parameter setting, considering only the number of connected users, is unreasonable, as with such a mechanism, no difference among MTC devices is taken into account. For example, An MTC device may get no access in a long time, or there may be a lot of to-be sent data in a local buffer thereof, such that there is a long queue accumulated in a memory thereof. When the MTC device determines whether to perform access only by generating the parameter q and comparing the q with the parameter p, access probability thereof will not increase with the queue length in the buffer of the device. In addition, introduction of an EAB mechanism will greatly increase an access time, and thus a device may have no network access in a very long time. In this case when to-be-sent data in the device keeps increasing, buffer overflow may occur, thus leading to packet loss (due to MTC device particularity, to reduce a volume and power consumption, generally storage capacity of an MTC device will not be too large, and thus buffer capacity is limited).

SUMMARY

Embodiments herein provide a method and apparatus for accessing a mobile communication system by an MTC device, capable of avoiding packet loss caused by buffer overflow in an MTC device with heavy traffic due to lack of network access in related art.

An embodiment herein provides a method for accessing a mobile communication system by a Machine-Type Communication (MTC) device, including: after an access network element (NE) acquires a queue limiting factor, acquiring, by an MTC device of a common access level, a queue limiting factor corresponding to the common access level by monitoring a broadcast channel; computing, by the MTC device, a local buffer queue length; determining, according to the computed local buffer queue length and the acquired queue limiting factor, whether extended access barring (EAB) can be performed; when EAB cannot be performed, continuing to acquire the queue limiting factor corresponding to the common access level by monitoring the broadcast channel; when EAB can be performed, executing the EAB, and determining, according to a result of executing the EAB, whether to initiate mobile communication system random access.

The access NE may acquire the queue limiting factor as follows. An MTC server may acquire, from an MTC application side, buffer information of any MTC device at the MTC application side, and notify the access NE of any acquired buffer information. The access NE may compute, according to the any acquired buffer information, average traffic per MTC device corresponding to a common access level; acquire, according to the average traffic, a queue limiting factor corresponding to the common access level; include the queue limiting factor corresponding to a common access level in an EAB System Information Block (SIB), and broadcast the EAB SIB. An MTC device of a common access level may acquire a queue limiting factor corresponding to the common access level by monitoring a broadcast channel by: monitoring the broadcast channel; and acquiring the queue limiting factor corresponding to the preset common access level from an EAB System Information Block (SIB) of the broadcast channel.

The buffer information may include: a length of a queue of to-be-sent data traffic in a buffer of an MTC device at the MTC application side, an average buffer length per MTC device corresponding to the MTC application side, and a number of all MTC devices at the MTC application side. The access NE may compute, according to the any acquired buffer information, average traffic per MTC device corresponding to a common access level by: computing, according to a formula 1, the average traffic per MTC device corresponding to a common access level as $$\frac{SumQueue}{Num \times BufferLength}. \quad \text{formula 1}$$

The SumQueue is a sum over lengths of queues of to-be-sent data traffic in buffers of all MTC devices of an access level. The Num is an MTC device number corresponding to the access level. The BufferLength is an average buffer length per MTC device corresponding to the access level.

The access NE may acquire, according to the average traffic, a queue limiting factor corresponding to the common access level by: determining a percent range corresponding to the average traffic; searching a preset traffic buffer parameter set for an integer corresponding to the percent range, and setting the found integer as the queue limiting factor corresponding to the common access level. The traffic buffer parameter set may include a correspondence between a percent range of a buffer length occupied by the queue of to-be-sent data traffic in the buffer of an MTC device and a preset integer.

The MTC device may determine, according to the computed local buffer queue length and the acquired queue limiting factor, whether extended access barring (EAB) can be performed by: updating the queue limiting factor by subtracting a locally saved buffered Queue Access Control Reject Number (QACRN) from the acquired queue limiting factor; computing a ratio of the local buffer queue length to a buffer length, and selecting, from a preset traffic buffer parameter set, an integer a corresponding to the ratio. The traffic buffer parameter set may include a correspondence between a percent range of a buffer length occupied by the queue of to-be-sent data traffic in the buffer of an MTC device and a preset integer. The MTC device may compare the integer a with the updated queue limiting factor. When the integer a is less than or equal to the updated queue limiting factor, the MTC device may compute an absolute difference δ between the updated queue limiting factor and the integer a, compute a waiting time according to f(δ), increase the locally saved QACRN by 1 upon expiration of the waiting time, and again acquire a queue limiting factor corresponding to a common access level by monitoring a broadcast channel. When the integer a is greater than the updated queue limiting factor, the MTC device may execute the EAB. The f(δ) may be configured for: obtaining the waiting time of the MTC device.

The MTC device may execute the EAB, and determine, according to a result of executing the EAB, whether to initiate mobile communication system random access by: clearing a locally saved Queue Access Control Reject Number (QACRN), and acquiring, from an EAB System Information Block (SIB) of the broadcast channel, a parameter p, 0<p<1; randomly generating a parameter q, 0<q<1, and comparing the parameter q with the acquired parameter p; when q<p, initiating the mobile communication system random access; otherwise when q≥p, not initiating the mobile communication system random access, and upon expiration of a preset time, continuing to clear the locally saved QACRN and to acquire, from the EAB SIB of the broadcast channel, the parameter p.

The correspondence between a percent range of the buffer length occupied by the queue of to-be-sent data traffic in the buffer of an MTC device and a preset integer in the traffic buffer parameter set may include: [0%, 10%) corresponding to an integer 0, [10%, 20%) corresponding to an integer 1, [20%, 30%) corresponding to an integer 2, [30%, 40%) corresponding to an integer 3, [40%, 50%) corresponding to an integer 4, [50%, 60%) corresponding to an integer 5, [60%, 70%) corresponding to an integer 6, [70%, 80%) corresponding to an integer 7, [80%, 90%) corresponding to an integer 8, and [90%, 100%] corresponding to an integer 9.

The traffic buffer parameter set may be set in the access NE and an MTC device.

The method may further include: upon updating of the EAB SIB, acquiring the buffer information again.

An embodiment herein further provides an apparatus for accessing a mobile communication system by a Machine-Type Communication (MTC) device, including a monitoring module and a processing module. The monitoring module is configured for: after an access network element (NE) acquires a queue limiting factor, acquiring a queue limiting factor corresponding to a common access level by monitoring a broadcast channel. The processing module is configured for: computing a local buffer queue length; determining, according to the computed local buffer queue length and the acquired queue limiting factor, whether extended access barring (EAB) can be performed; when EAB cannot be performed, calling the monitoring module; when EAB can be performed, executing the EAB, and determining, according to a result of executing the EAB, whether to initiate mobile communication system random access.

The monitoring module may include a first acquiring subunit, a notifying subunit, a second acquiring subunit, and a broadcast subunit.

The first acquiring subunit may be configured for: acquiring, by an MTC server from an MTC application side, buffer information of any MTC device at the MTC application side.

The notifying subunit may be configured for: notifying, by the MTC server, the access NE of any acquired buffer information.

The second acquiring subunit may be configured for: computing, by the access NE according to the any acquired buffer information, average traffic per MTC device corresponding to a common access level; and acquiring, according to the average traffic, a queue limiting factor corresponding to the common access level.

The broadcast subunit may be configured for: including, by the access NE, the queue limiting factor corresponding to a common access level in an EAB System Information Block (SIB), and broadcasting the EAB SIB.

The monitoring module may further include:
a monitoring subunit configured for: monitoring, by the MTC device, the broadcast channel; and acquiring the queue limiting factor corresponding to the preset common access level from an EAB System Information Block (SIB) of the broadcast channel.

The buffer information may include: a length of a queue of to-be-sent data traffic in a buffer of an MTC device at the MTC application side, an average buffer length per MTC device corresponding to the MTC application side, and a number of all MTC devices at the MTC application side.

The second acquiring subunit may be further configured for: computing, according to a formula 1, the average traffic per MTC device corresponding to a common access level as $$\frac{SumQueue}{Num \times BufferLength}. \qquad \text{formula 1}$$

The SumQueue is a sum over lengths of queues of to-be-sent data traffic in buffers of all MTC devices of an access level. The Num is an MTC device number corresponding to the access level. The BufferLength is an average buffer length per MTC device corresponding to the access level.

The second acquiring subunit may be further configured for: determining a percent range corresponding to the average traffic; searching a preset traffic buffer parameter set for an integer corresponding to the percent range, and setting the found integer as the queue limiting factor corresponding to the common access level. The traffic buffer parameter set may include a correspondence between a percent range of a buffer length occupied by the queue of to-be-sent data traffic in the buffer of an MTC device and a preset integer.

The processing module may include:
a first processing subunit configured for: updating, by the MTC device, the queue limiting factor by subtracting a locally saved buffered Queue Access Control Reject Number (QACRN) from the acquired queue limiting factor; computing, by the MTC device, a ratio of the local buffer queue length to a buffer length, and selecting, from a preset traffic buffer parameter set, an integer a corresponding to the ratio. The traffic buffer parameter set may include a correspondence between a percent range of a buffer length occupied by the queue of to-be-sent data traffic in the buffer of an MTC device and a preset integer. The first processing subunit may be further configured for: comparing, by the MTC device, the integer a with the updated queue limiting factor; when the integer a is less than or equal to the updated queue limiting factor, computing an absolute difference δ between the updated queue limiting factor and the integer a, computing a waiting time according to f(δ), increasing the locally saved QACRN by 1 upon expiration of the waiting time, and again acquiring a queue limiting factor corresponding to a common access level by monitoring a broadcast channel; when the integer a is greater than the updated queue limiting factor, executing the EAB, wherein the f(δ) is configured for: obtaining the waiting time of the MTC device.

The processing module may further include:
a second processing subunit configured for: clearing, by the MTC device, a locally saved Queue Access Control Reject Number (QACRN), and acquiring, from an EAB System Information Block (SIB) of the broadcast channel, a parameter p, 0<p<1; randomly generating, by the MTC device, a parameter q, 0<q<1, and comparing the parameter q with the acquired parameter p; when q<p, initiating the mobile communication system random access; otherwise when q≥p, prohibiting the MTC device from initiating the mobile communication system random access, and upon expiration of a preset time, continuing to clear the locally saved QACRN and to acquire, from the EAB SIB of the broadcast channel, the parameter p.

The correspondence between a percent range of the buffer length occupied by the queue of to-be-sent data traffic in the buffer of an MTC device and a preset integer in the traffic buffer parameter set may be: [0%, 10%) corresponding to an integer 0, [10%, 20%) corresponding to an integer 1, [20%, 30%) corresponding to an integer 2, [30%, 40%) corresponding to an integer 3, [40%, 50%) corresponding to an integer 4, [50%, 60%) corresponding to an integer 5, [60%, 70%) corresponding to an integer 6, [70%, 80%) corresponding to an integer 7, [80%, 90%) corresponding to an integer 8, and [90%, 100%] corresponding to an integer 9.

Embodiments herein provides beneficial effect as follows.

An MTC device may decide whether to initiate an access process by computing a local traffic buffer state, and comparing the local traffic buffer state with a queue limiting factor (also known as a buffer state parameter) acquired from a broadcast channel, avoiding packet loss caused by buffer overflow in an MTC device with heavy traffic due to lack of network access in related art. With a technical solution according to an embodiment herein, access network congestion caused by an excessively large MTC device number may be alleviated, avoiding negative impact on a conventional user. In addition, buffer overflow in an MTC device with heavy traffic due to lack of network access may be avoided, reducing a packet loss rate, improving network resource utilization, and increasing system efficiency. Traffic data integrity at a user side may be ensured, as well as allowing to somewhat reduce power consumption in repeated data generation/receiving due to buffer overflow in an MTC device.

BRIEF DESCRIPTION OF THE DRAWINGS

Those skilled in the art will clearly understand advantages and beneficial effect herein via detailed illustration of implementation below. The drawings are merely for showing implementation and shall not be taken as limiting the disclosure. In addition, throughout the drawings, identical parts are denoted by identical reference numerals.

DETAILED DESCRIPTION

In view of packet loss caused by buffer overflow in an MTC device with heavy traffic due to lack of network access in related art, embodiments herein provide a method and apparatus for accessing a mobile communication system by an MTC device. According to an embodiment herein, an MTC device may have to monitor a broadcast channel to obtain a buffer state parameter, compute a traffic buffer state, and compare the computed traffic buffer state with the buffer state parameter to decide whether to initiate an access process.

Figure 1:
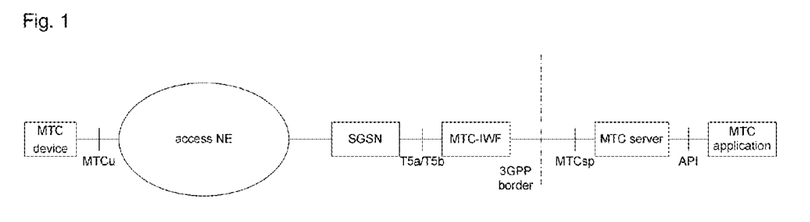
FIG. 1 is a schematic diagram of 3GPP architecture networking in MTC communication according to an embodiment herein.

FIG. 1 is a schematic diagram of 3GPP architecture networking in MTC communication according to an embodiment herein. As shown in FIG. 1, an MTC Server and an access network element (NE), such as a 3GPP access NE, may exchange information through interfaces MTCsp, T5a/T5b and NEs MTC-IWF, SGSN. An MTC Server and an MTC Application may exchange information through an API interface. An access NE and an MTC device may interact through an MTCu interface. Based on the architecture, the disclosure is further elaborated below with reference to drawings and embodiments. Note that an embodiment illustrated here is merely for explaining the disclosure, and does not limit the disclosure.

Method Embodiment

Figure 2:
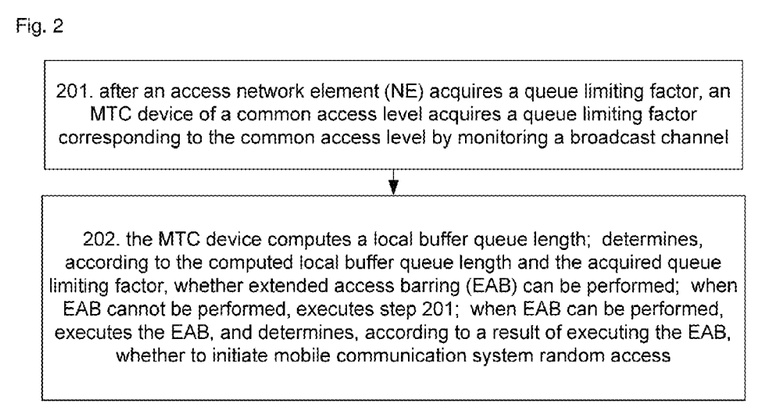
FIG. 2 is a flowchart of a method for accessing a mobile communication system by an MTC device according to an embodiment herein.

An embodiment herein provides a method for accessing a mobile communication system by an MTC device. FIG. 2 is a flowchart of a method for accessing a mobile communication system by an MTC device according to an embodiment herein. As shown in FIG. 2, a method for accessing a mobile communication system by an MTC device according to an embodiment herein may include steps as follows.

In step 201, after an access NE acquires a queue limiting factor (also known as a buffer state parameter), an MTC device of a common access level acquires a queue limiting factor corresponding to the common access level by monitoring a broadcast channel.

Figure 3:
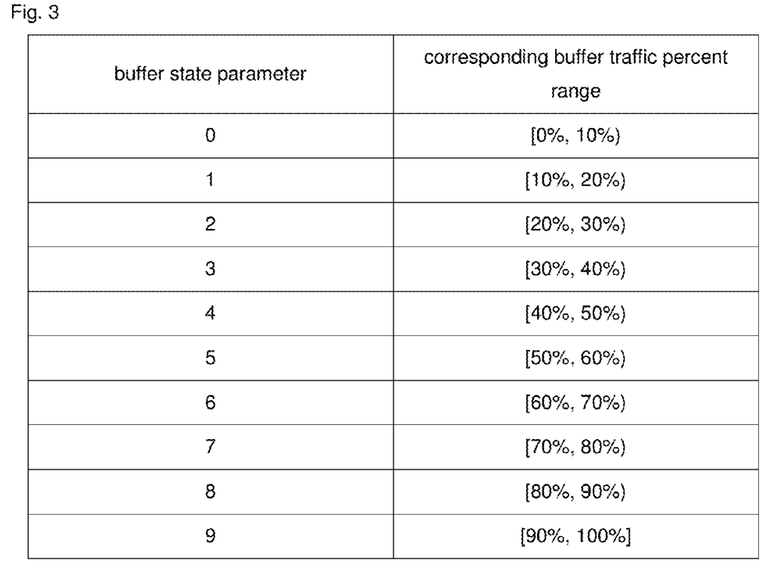
FIG. 3 is a schematic diagram of a traffic buffer parameter set according to an embodiment herein.

Note that the queue limiting factor may come from a traffic buffer parameter set maintained at both an access NE and an MTC device side. The traffic buffer parameter set may include a correspondence between a percent range of a buffer length occupied by a queue of to-be-sent data traffic in the buffer of an MTC device and a preset integer. FIG. 3 is a schematic diagram of a traffic buffer parameter set according to an embodiment herein. As shown in FIG. 3, the correspondence in the traffic buffer parameter set may be: [0%, 10%) corresponding to an integer 0, [10%, 20%) corresponding to an integer 1, [20%, 30%) corresponding to an integer 2, [30%, 40%) corresponding to an integer 3, [40%, 50%) corresponding to an integer 4, [50%, 60%) corresponding to an integer 5, [60%, 70%) corresponding to an integer 6, [70%, 80%) corresponding to an integer 7, [80%, 90%) corresponding to an integer 8, and [90%, 100%] corresponding to an integer 9. A bracket denotes endpoint inclusion. A parenthesis denotes endpoint exclusion.

In step 201, the access NE may acquire the queue limiting factor as follows.

In step 2011, an MTC server may acquire, from an MTC application side, buffer information of any MTC device at the MTC application side. According to an embodiment herein, the MTC server may acquire, from an MTC application side through an API interface, MTC-traffic-related MTC device buffer information. Such buffer information may include: a length of a queue of to-be-sent data traffic in a buffer of an MTC device at an MTC application side, an average buffer length per MTC device corresponding to the MTC application side, and a number of all MTC devices at the MTC application side.

In step 2012, the MTC server may notify the access NE of any acquired buffer information. The access NE and the MTC server may exchange such buffer state information through interfaces MTCsp, T5a/T5b and NEs MTC-IWF, SGSN, such that the access NE may obtain such buffer state information.

In step 2013, the access NE may compute, according to the any acquired buffer information, average traffic per MTC device corresponding to a common access level; and acquire, according to the average traffic, a queue limiting factor corresponding to the common access level. Namely, the access NE may compute, according to the obtained information, the current average traffic corresponding to a common access level (0~9), choose an integer in the traffic buffer parameter set that corresponds to a proper percent range as a buffer state parameter to be broadcast as required by buffer state access control, and then broadcast the chosen buffer state parameter within an EAB SIB.

The average traffic per MTC device corresponding to a common access level may be computed, according to a formula 1, as $$\frac{SumQueue}{Num \times BufferLength}, \quad \text{formula 1}$$

the SumQueue is a sum over lengths of queues of to-be-sent data traffic in buffers of all MTC devices of an access level, the Num is an MTC device number corresponding to the access level, and the BufferLength is an average buffer length per MTC device corresponding to the access level.

In step 2013, the queue limiting factor corresponding to the common access level may be acquired according to the average traffic as follows.

1, a percent range corresponding to the average traffic may be determined;

2, a preset traffic buffer parameter set may be searched for an integer corresponding to the percent range, and the found integer may be set as the queue limiting factor corresponding to the common access level.

Figure 4:
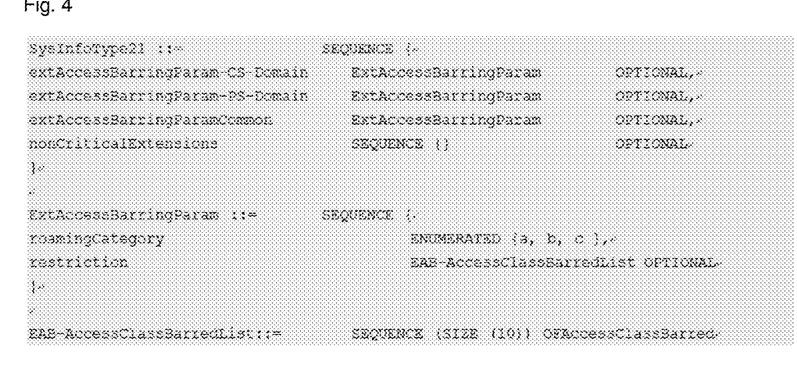
FIG. 4 is a schematic diagram of EAB SIB configuration in an existing protocol according to an embodiment herein.
Figure 5:
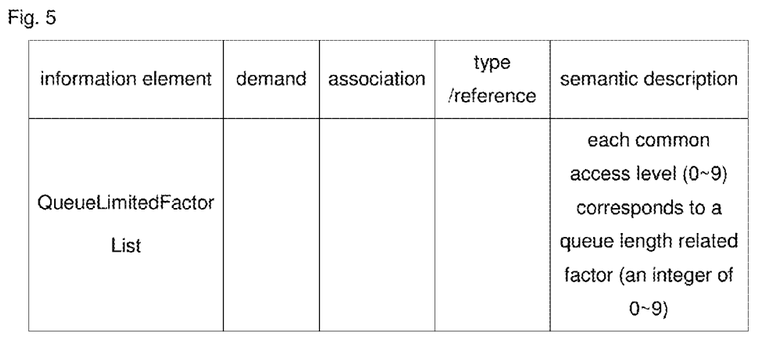
FIG. 5 is a schematic diagram of an EAB SIB protocol data unit including a queue limiting factor according to an embodiment herein.

In step 2014, the access NE may include the queue limiting factor corresponding to a common access level in an EAB SIB, and broadcast the EAB SIB. FIG. 4 is a schematic diagram of EAB SIB configuration in an existing protocol according to an embodiment herein. An existing EAB SIB may mainly include an EAB extended access level barring factor list and a roaming parameter without introducing any queue limiting factor. FIG. 5 is a schematic diagram of an EAB SIB protocol data unit including a queue limiting factor according to an embodiment herein. As shown in FIG. 5, a queue limiting factor (an integer of 0~9) may have to be added for each common access level (0~9), and thus a QueueLimitedFactor List may have to be added in an EAB SIB. The access NE may include the queue limiting factor corresponding to a common access level in an EAB SIB, and broadcast the EAB SIB according to FIG. 4 and FIG. 5.

Then, the MTC device may have to monitor the broadcast channel; and acquire the queue limiting factor corresponding to the preset common access level from an EAB SIB of the broadcast channel.

Note that only an MTC device configured with an EAB common access level (0~9) may have to monitor a queue limiting factor in the EAB SIB in the broadcast channel. Otherwise, an MTC device configured with a special access level (11~15) may directly perform conventional ACB without monitoring broadcast information in the EAB SIB.

In step 202, the MTC device computes a local buffer queue length; determines, according to the computed local buffer queue length and the acquired queue limiting factor, whether extended access barring (EAB) can be performed; when EAB cannot be performed, executes step 201; when EAB can be performed, executes the EAB, and determines, according to a result of executing the EAB, whether to initiate mobile communication system random access.

In step 202, the MTC device may determine, according to the computed local buffer queue length and the acquired queue limiting factor, whether EAB can be performed as follows.

In step 2021a, the MTC device may update the queue limiting factor by subtracting a locally saved buffered Queue Access Control Reject Number (QACRN) from the acquired queue limiting factor.

In the step, a local parameter, known as buffered QACRN, with an initial value 0, may have to be configured for an MTC device.

In step 2022a, the MTC device may compute a ratio of the local buffer queue length to a buffer length, and select, from a preset traffic buffer parameter set, an integer a corresponding to the ratio. The traffic buffer parameter set may include the correspondence between a percent range of a buffer length occupied by the queue of to-be-sent data traffic in the buffer of an MTC device and a preset integer.

In step 2023a, the MTC device may compare the integer a with the updated queue limiting factor; when the integer a is less than or equal to the updated queue limiting factor, compute an absolute difference $\delta$ between the updated queue limiting factor and the integer a, compute a waiting time according to f($\delta$), increase the locally saved QACRN by 1 upon expiration of the waiting time, and execute step 201 again; when the integer a is greater than the updated queue limiting factor, execute the EAB. The f($\delta$) may be configured for: obtaining the waiting time of the MTC device, and may be defined as needed. For example, f($\delta$)=$\tau_0$+$\omega \cdot \delta$, $\tau_0$ being a minimal waiting time such as 3 access slots, $\omega$ being a preset reference coefficient for: converting the absolute difference $\delta$ into an amount of time, which may be defined as needed. For example when $\omega$=1, the waiting time may be increased by 1 access slot per absolute difference unit. When $\omega$=2, the waiting time may be increased by 2 access slots per absolute difference unit.

In step 202, the EAB may be executed, and it may be determined, according to a result of executing the EAB, whether to initiate mobile communication system random access as follows.

In step 2021b, the MTC device may clear a locally saved Queue Access Control Reject Number (QACRN), and acquire, from an EAB System Information Block (SIB) of the broadcast channel, a parameter p (extended access level barring factor), 0<p<1.

In step 2022b, the MTC device may randomly generate a parameter q, 0<q<1, and compare the parameter q with the acquired parameter p; when q<p, initiate the mobile communication system random access; otherwise when q≥p, the MTC device may be prohibited from initiating the mobile communication system random access, and may repeat step 2021b upon expiration of a preset time.

According to an embodiment herein, upon updating of the EAB SIB, the buffer information may be acquired again. Namely, upon updating of the EAB SIB, the queue limiting factor (buffer state information) may have to be acquired again. That is, a frequency in acquiring the queue limiting factor equals that in EAB SIB updating.

It may be seen that with a technical solution according to an embodiment herein, an access priority of an MTC device with heavy traffic may be increased to some extent, avoiding packet loss caused by buffer overflow in some MTC devices due to long-time lack of network access when a large number of MTC devices initiate access, ensuring traffic data integrity at a user side, and allowing to somewhat reduce power consumption in repeated data generation/receiving due to buffer overflow in an MTC device.

An aforementioned technical solution according to an embodiment herein is elaborated below with reference to the drawings.

Figure 6:
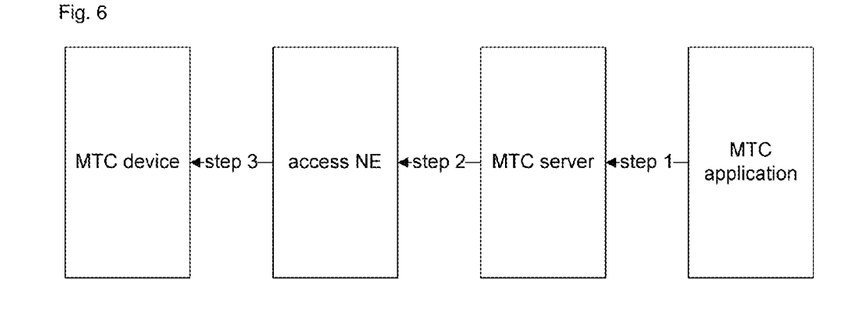
FIG. 6 is a schematic diagram of acquiring, for an MTC application, a queue limiting factor according to an embodiment herein.

FIG. 6 is a schematic diagram of acquiring, for an MTC application, a queue limiting factor according to an embodiment herein. As shown in FIG. 6, the flow may include steps as follows.

In step 1, an MTC application may be connected to an MTC server through an API interface. The MTC application and the MTC server may exchange information on a size of a packet of data traffic conveyed by an MTC device (i.e., a length of a queue of to-be-sent data traffic in a buffer of an MTC device), an average buffer length per MTC device, a number of MTC devices, and the like.

In step 2, after obtaining the information on the queue length in the buffer of an MTC device, the average buffer length per MTC device, the number of MTC devices and the like, the MTC server may convey the obtained information to an access NE through interfaces MTCsp, T5a/T5b and NEs MTC-IWF, SGSN.

In step 3, the access NE may compute, according to the obtained information on the queue length in the buffer of an MTC device, the average buffer length per MTC device, the number of MTC devices and the like using $$\frac{SumQueue}{Num \times BufferLength},$$

the current average traffic per MTC device corresponding to a common access level (0~9) with respect to a designed average buffer length. The SumQueue is a sum over queue lengths in buffers of all MTC devices of an access level. The Num is an MTC device number corresponding to the access level. The BufferLength is an average buffer length per MTC device. An integer in the traffic buffer parameter set that corresponds to a proper percent range may be chosen as a queue limiting factor required by buffer state access control, and broadcast the queue limiting factor within an EAB SIB through a broadcast channel. An MTC device may acquire a relevant parameter by monitoring the broadcast channel.

Figure 7:
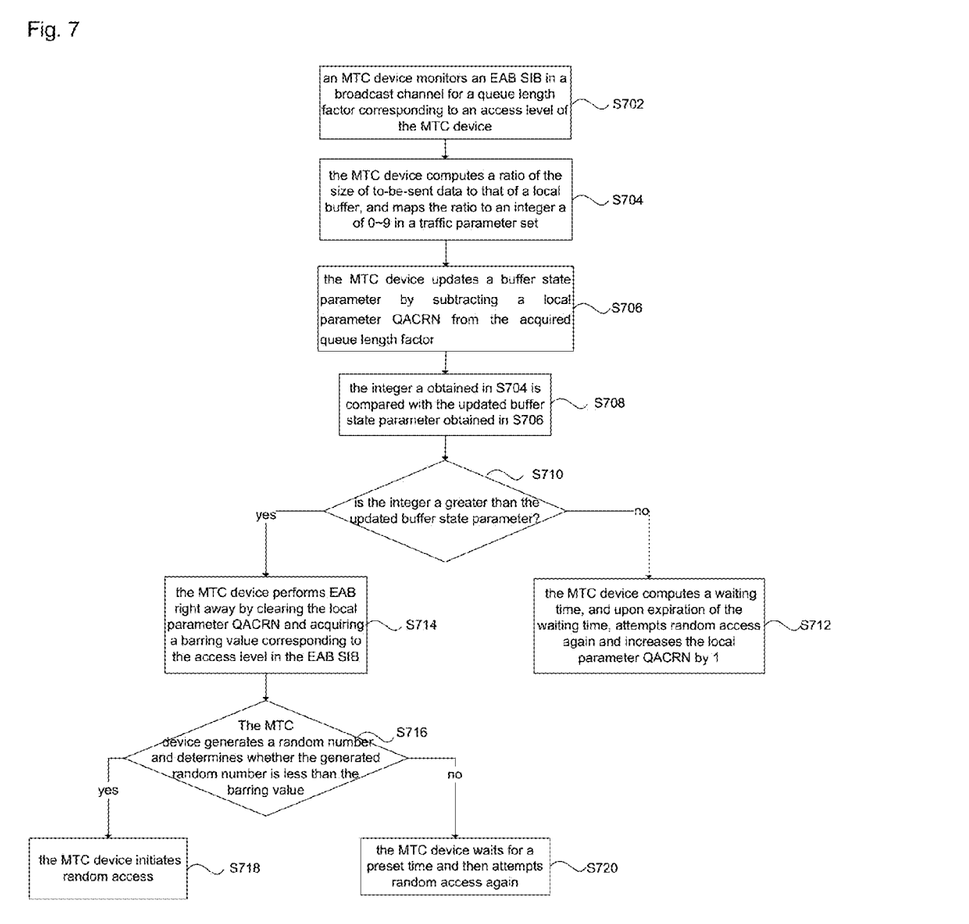
FIG. 7 is a flowchart of random access by an MTC device of a common access level (0~9) according to an embodiment herein.

FIG. 7 is a flowchart of random access by an MTC device of a common access level (0~9) according to an embodiment herein. As shown in FIG. 7, the flow may include steps as follows.

In step S702, when an MTC device of a common level needs to send data, the MTC device will first acquire, from an EAB SIB in a monitored broadcast channel, a buffer state parameter (queue limiting factor) corresponding to the access level.

In step S704, the MTC device may compute a ratio of the size of to-be-sent data to that of a local buffer, and map the ratio to an integer a of 0~9 according to a traffic parameter set according to FIG. 3.

In step S706, the MTC device may update the buffer state parameter by subtracting a local parameter QACRN from the buffer state parameter acquired from the EAB SIB. Thus, as the number of failed access attempts of an MTC device increases due to buffered queue access control, probability in access by the MTC device may be increased as appropriate, such that an MTC device with light traffic is more likely to get network access.

In step S708, the MTC device may initiate buffer state parameter access control. The MTC device may compare the integer a obtained in S704 with the updated buffer state parameter obtained in S706.

In step S710, when the integer a obtained in S704 is greater than the updated buffer state parameter obtained in S706, the flow goes to step S714; otherwise when the integer a obtained in S704 is less than or equal to the updated buffer state parameter obtained in S706, the flow goes to step S712.

In step S712, the MTC device may compute, according to an absolute difference δ between the updated buffer state parameter obtained in S706 and the integer a obtained in S704 using f(δ), a waiting time proportional to the absolute difference. The f(δ) is configured for: obtaining the waiting time of the MTC device. Upon expiration of the waiting time, the MTC device may attempt access again, and increase the local parameter QACRN by 1.

In step S714, the MTC device may initiate EAB by clearing the local parameter QACRN, and acquiring, from the EAB SIB, an EAB barring factor corresponding to the access level (the parameter p of 0~1).

In step S716, the MTC device may generate a random number of 0~1 and compare the random number with the EAB barring factor. When the random number (the parameter q) is less than the EAB barring factor, the flow goes to step S718; otherwise when it is greater than or equal to the EAB barring factor, the flow goes to step S720.

In step S718, the MTC device may initiate random access, and the flow ends.

In step S720, random access by the MTC device is rejected. The MTC device may attempt access again upon expiration of a preset time.

Figure 8:
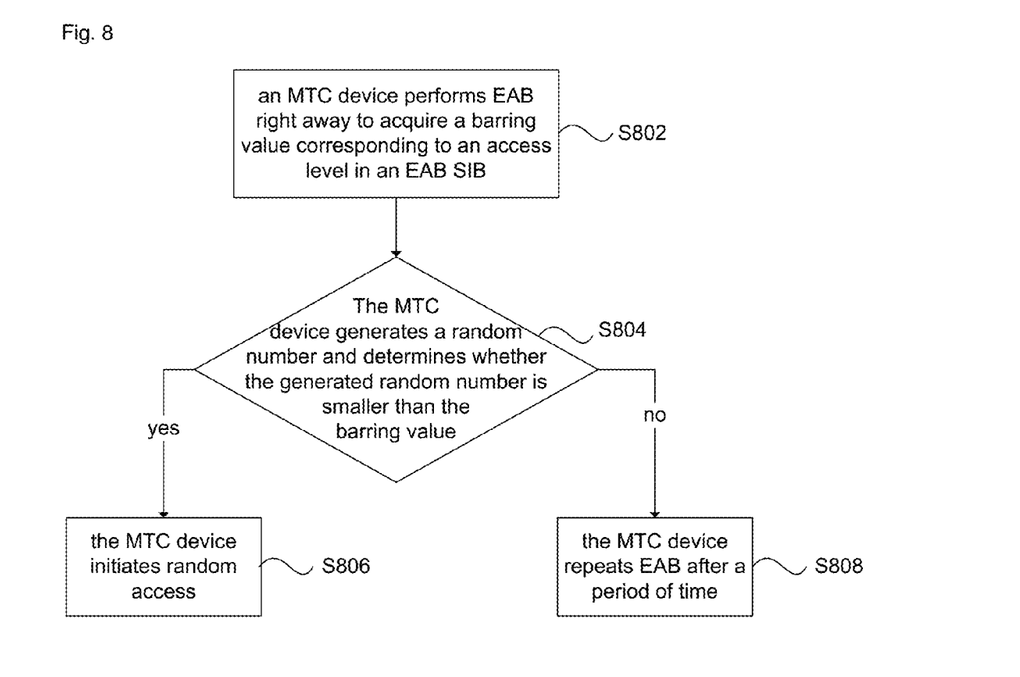
FIG. 8 is a flowchart of random access by an MTC device of a special access level (11~15) according to an embodiment herein.

FIG. 8 is a flowchart of random access by an MTC device of a special access level (11~15) according to an embodiment herein. As shown in FIG. 8, the flow of random access by an MTC device of a special access level (11~15) may remain the same, including steps as follows.

In step S802, an MTC device may initiate EAB. The device first has to acquire, from an EAB SIB, an EAB barring factor (of 0~1) corresponding to the access level.

In step S804, the MTC device may generate a random number of 0~1 and compare the random number with the EAB barring factor. When the random number is less than the EAB barring factor, the flow goes to step S806; otherwise when it is greater than or equal to the EAB barring factor, the flow goes to step S808.

In step S806, the MTC device may initiate random access, and the flow ends.

In step S808, random access by the MTC device is rejected. The MTC device may initiate EAB again upon expiration of a preset time.

To sum up, with a technical solution according to an embodiment herein, an MTC device may decide whether to initiate an access process by computing a local traffic buffer state, and comparing the local traffic buffer state with a queue limiting factor (also known as a buffer state parameter) acquired from a broadcast channel, avoiding packet loss caused by buffer overflow in an MTC device with heavy traffic due to lack of network access in related art. With a technical solution according to an embodiment herein, access network congestion caused by an excessively large MTC device number may be alleviated, avoiding negative impact on a conventional user. In addition, buffer overflow in an MTC device with heavy traffic due to lack of network access may be avoided, reducing a packet loss rate, improving network resource utilization, and increasing system efficiency. Traffic data integrity at a user side may be ensured, as well as allowing to somewhat reduce power consumption in repeated data generation/receiving due to buffer overflow in an MTC device.

Apparatus Embodiment

Figure 9:
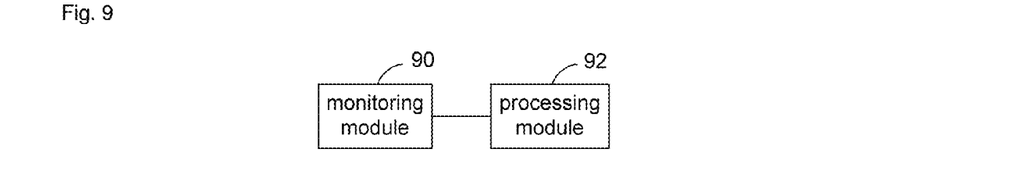
FIG. 9 is a schematic diagram of a structure of an apparatus for accessing a mobile communication system by an MTC device according to an embodiment herein.

An embodiment herein provides an apparatus for accessing a mobile communication system by an MTC device. FIG. 9 is a schematic diagram of a structure of an apparatus for accessing a mobile communication system by an MTC device according to an embodiment herein. As shown in FIG. 9, an apparatus for accessing a mobile communication system by an MTC device according to an embodiment herein may include a monitoring module 90 and a processing module 92.

The monitoring module 90 may be configured for: after an access NE acquires a queue limiting factor (also known as a buffer state parameter), acquiring a queue limiting factor corresponding to a common access level by monitoring a broadcast channel.

Note that the queue limiting factor may come from a traffic buffer parameter set maintained at both an access NE and an MTC device side. The traffic buffer parameter set may include a correspondence between a percent range of a buffer length occupied by a queue of to-be-sent data traffic in the buffer of an MTC device and a preset integer. FIG. 3 is a schematic diagram of a traffic buffer parameter set according to an embodiment herein. As shown in FIG. 3, the correspondence in the traffic buffer parameter set may be: [0%, 10%) corresponding to an integer 0, [10%, 20%) corresponding to an integer 1, [20%, 30%) corresponding to an integer 2, [30%, 40%) corresponding to an integer 3, [40%, 50%) corresponding to an integer 4, [50%, 60%) corresponding to an integer 5, [60%, 70%) corresponding to an integer 6, [70%, 80%) corresponding to an integer 7, [80%, 90%) corresponding to an integer 8, and [90%, 100%] corresponding to an integer 9. A bracket denotes endpoint inclusion. A parenthesis denotes endpoint exclusion.

The access NE may acquire the queue limiting factor as follows.

First, an MTC server may acquire, from an MTC application side, buffer information of any MTC device at the MTC application side. According to an embodiment herein, the MTC server may acquire, from an MTC application side through an API interface, MTC-traffic-related MTC device buffer information. Such buffer information may include: a length of a queue of to-be-sent data traffic in a buffer of an MTC device at an MTC application side, an average buffer length per MTC device corresponding to the MTC application side, and a number of all MTC devices at the MTC application side.

Then, the MTC server may notify the access NE of any acquired buffer information. The access NE and the MTC server may exchange such buffer state information through interfaces MTCsp, T5a/T5b and NEs MTC-IWF, SGSN, such that the access NE may obtain such buffer state information.

Then, the access NE may compute, according to the any acquired buffer information, average traffic per MTC device corresponding to a common access level; and acquire, according to the average traffic, a queue limiting factor corresponding to the common access level. Namely, the access NE may compute, according to the obtained information, the current average traffic corresponding to a common access level (0~9), choose an integer in the traffic buffer parameter set that corresponds to a proper percent range as a buffer state parameter to be broadcast as required by buffer state access control, and then broadcast the chosen buffer state parameter within an EAB SIB.

The average traffic per MTC device corresponding to a common access level may be computed, according to a formula 1, as $$\frac{SumQueue}{Num \times BufferLength}, \quad \text{formula 1}$$

the SumQueue is a sum over lengths of queues of to-be-sent data traffic in buffers of all MTC devices of an access level, the Num is an MTC device number corresponding to the access level, and the BufferLength is an average buffer length per MTC device corresponding to the access level.

The queue limiting factor corresponding to the common access level may be acquired according to the average traffic as follows.

1, a percent range corresponding to the average traffic may be determined;

2, a preset traffic buffer parameter set may be searched for an integer corresponding to the percent range, and the found integer may be set as the queue limiting factor corresponding to the common access level.

Finally, the access NE may include the queue limiting factor corresponding to a common access level in an EAB SIB, and broadcast the EAB SIB. FIG. 4 is a schematic diagram of EAB SIB configuration in an existing protocol according to an embodiment herein. An existing EAB SIB may mainly include an EAB extended access level barring factor list and a roaming parameter without introducing any queue limiting factor. FIG. 5 is a schematic diagram of an EAB SIB protocol data unit including a queue limiting factor according to an embodiment herein. As shown in FIG. 5, a queue limiting factor (an integer of 0~9) may have to be added for each common access level (0~9), and thus a QueueLimitedFactor List may have to be added in an EAB SIB. The access NE may include the queue limiting factor corresponding to a common access level in an EAB SIB, and broadcast the EAB SIB according to FIG. 4 and FIG. 5.

Then, the MTC device may have to monitor the broadcast channel; and acquire the queue limiting factor corresponding to the preset common access level from an EAB SIB of the broadcast channel.

Note that only an MTC device configured with an EAB common access level (0~9) may have to monitor a queue limiting factor in the EAB SIB in the broadcast channel.

Otherwise, an MTC device configured with a special access level (11~15) may directly perform conventional ACB without monitoring broadcast information in the EAB SIB.

The processing module 92 may be configured for: computing a local buffer queue length; determining, according to the computed local buffer queue length and the acquired queue limiting factor, whether extended access barring (EAB) can be performed; when EAB cannot be performed, calling the monitoring module 90; when EAB can be performed, executing the EAB, and determining, according to a result of executing the EAB, whether to initiate mobile communication system random access.

The processing module 92 may determine, according to the computed local buffer queue length and the acquired queue limiting factor, whether EAB can be performed as follows.

1, the processing module 92 may update the queue limiting factor by subtracting a locally saved buffered Queue Access Control Reject Number (QACRN) from the acquired queue limiting factor.

Here, a local parameter, known as buffered QACRN, with an initial value 0, may have to be configured for an MTC device.

2, the processing module 92 may compute a ratio of the local buffer queue length to a buffer length, and select, from a preset traffic buffer parameter set, an integer a corresponding to the ratio. The traffic buffer parameter set may include the correspondence between a percent range of a buffer length occupied by the queue of to-be-sent data traffic in the buffer of an MTC device and a preset integer.

3, the processing module 92 may compare the integer a with the updated queue limiting factor; when the integer a is less than or equal to the updated queue limiting factor, compute an absolute difference δ between the updated queue limiting factor and the integer a, compute a waiting time according to f(δ), increase the locally saved QACRN by 1 upon expiration of the waiting time, and execute step 201 again; when the integer a is greater than the updated queue limiting factor, execute the EAB. The f(δ) may be configured for: obtaining the waiting time of the MTC device, and may be defined as needed. For example, f(δ)=$\tau_0$+ω·δ, $\tau_0$ being a minimal waiting time such as 3 access slots, ω being a preset reference coefficient for: converting the absolute difference δ into an amount of time, which may be defined as needed. For example when ω=1, the waiting time may be increased by 1 access slot per absolute difference unit. When ω=2, the waiting time may be increased by 2 access slots per absolute difference unit.

The processing module 92 may execute the EAB, and determine, according to a result of executing the EAB, whether to initiate mobile communication system random access as follows.

First, the processing module 92 may clear a locally saved Queue Access Control Reject Number (QACRN), and acquire, from an EAB System Information Block (SIB) of the broadcast channel, a parameter p (extended access level barring factor), 0<p<1. Then, the processing module 92 may randomly generate a parameter q, 0<q<1, and compare the parameter q with the acquired parameter p; when q<p, initiate the mobile communication system random access; otherwise when q≥p, prohibit the MTC device from initiating the mobile communication system random access, and repeat the processing upon expiration of a preset time.

According to an embodiment herein, upon updating of the EAB SIB, the buffer information may be acquired again. Namely, upon updating of the EAB SIB, the queue limiting factor (buffer state information) may have to be acquired again. That is, a frequency in acquiring the queue limiting factor equals that in EAB SIB updating.

It may be seen that with a technical solution according to an embodiment herein, an access priority of an MTC device with heavy traffic may be increased to some extent, avoiding packet loss caused by buffer overflow in some MTC devices due to long-time lack of network access when a large number of MTC devices initiate access, ensuring traffic data integrity at a user side, and allowing to somewhat reduce power consumption in repeated data generation/receiving due to buffer overflow in an MTC device.

An aforementioned technical solution according to an embodiment herein is elaborated below with reference to the drawings.

FIG. 6 is a schematic diagram of acquiring, for an MTC application, a queue limiting factor according to an embodiment herein. As shown in FIG. 6, the flow may include steps as follows.

In step 1, an MTC application may be connected to an MTC server through an API interface. The MTC application and the MTC server may exchange information on a size of a packet of data traffic conveyed by an MTC device (i.e., a length of a queue of to-be-sent data traffic in a buffer of an MTC device), an average buffer length per MTC device, a number of MTC devices, and the like.

In step 2, after obtaining the information on the queue length in the buffer of an MTC device, the average buffer length per MTC device, the number of MTC devices and the like, the MTC server may convey the obtained information to an access NE through interfaces MTCsp, T5a/T5b and NEs MTC-IWF, SGSN.

In step 3, the access NE may compute, according to the obtained information on the queue length in the buffer of an MTC device, the average buffer length per MTC device, the number of MTC devices and the like using $$\frac{SumQueue}{Num \times BufferLength},$$

the current average traffic per MTC device corresponding to a common access level (0~9) with respect to a designed average buffer length. The SumQueue is a sum over queue lengths in buffers of all MTC devices of an access level. The Num is an MTC device number corresponding to the access level. The BufferLength is an average buffer length per MTC device. An integer in the traffic buffer parameter set that corresponds to a proper percent range may be chosen as a queue limiting factor required by buffer state access control, and broadcast the queue limiting factor within an EAB SIB through a broadcast channel. An MTC device may acquire a relevant parameter by monitoring the broadcast channel.

FIG. 7 is a flowchart of random access by an MTC device of a common access level (0~9) according to an embodiment herein. As shown in FIG. 7, the flow may include steps as follows.

In step S702, when an MTC device of a common level needs to send data, the MTC device will first acquire, from an EAB SIB in a monitored broadcast channel, a buffer state parameter (queue limiting factor) corresponding to the access level.

In step S704, the MTC device may compute a ratio of the size of to-be-sent data to that of a local buffer, and map the ratio to an integer a of 0~9 according to a traffic parameter set according to FIG. 3.

In step S706, the MTC device may update the buffer state parameter by subtracting a local parameter QACRN from the buffer state parameter acquired from the EAB SIB. Thus, as the number of failed access attempts of an MTC device increases due to buffered queue access control, probability in access by the MTC device may be increased as appropriate, such that an MTC device with light traffic is more likely to get network access.

In step S708, the MTC device may initiate buffer state parameter access control. The MTC device may compare the integer a obtained in S704 with the updated buffer state parameter obtained in S706.

In step S710, when the integer a obtained in S704 is greater than the updated buffer state parameter obtained in S706, the flow goes to step S714; otherwise when the integer a obtained in S704 is less than or equal to the updated buffer state parameter obtained in S706, the flow goes to step S712.

In step S712, the MTC device may compute, according to an absolute difference δ between the updated buffer state parameter obtained in S706 and the integer a obtained in S704 using f(δ), a waiting time proportional to the absolute difference. The f(δ) is configured for: obtaining the waiting time of the MTC device. Upon expiration of the waiting time, the MTC device may attempt access again, and increase the local parameter QACRN by 1.

In step S714, the MTC device may initiate EAB by clearing the local parameter QACRN, and acquiring, from the EAB SIB, an EAB barring factor corresponding to the access level (the parameter p of 0~1).

In step S716, the MTC device may generate a random number of 0~1 and compare the random number with the EAB barring factor. When the random number (the parameter q) is less than the EAB barring factor, the flow goes to step S718; otherwise when it is greater than or equal to the EAB barring factor, the flow goes to step S720.

In step S718, the MTC device may initiate random access, and the flow ends.

In step S720, random access by the MTC device is rejected. The MTC device may attempt access again upon expiration of a preset time.

FIG. 8 is a flowchart of random access by an MTC device of a special access level (11~15) according to an embodiment herein. As shown in FIG. 8, the flow of random access by an MTC device of a special access level (11~15) may remain the same, including steps as follows.

In step S802, an MTC device may initiate EAB. The device first has to acquire, from an EAB SIB, an EAB barring factor (of 0~1) corresponding to the access level.

In step S804, the MTC device may generate a random number of 0~1 and compare the random number with the EAB barring factor. When the random number is less than the EAB barring factor, the flow goes to step S806; otherwise when it is greater than or equal to the EAB barring factor, the flow goes to step S808.

In step S806, the MTC device may initiate random access, and the flow ends.

In step S808, random access by the MTC device is rejected. The MTC device may initiate EAB again upon expiration of a preset time.

To sum up, with a technical solution according to an embodiment herein, an MTC device may decide whether to initiate an access process by computing a local traffic buffer state, and comparing the local traffic buffer state with a queue limiting factor (also known as a buffer state parameter) acquired from a broadcast channel, avoiding packet loss caused by buffer overflow in an MTC device with heavy traffic due to lack of network access in related art. With a technical solution according to an embodiment herein, access network congestion caused by an excessively large MTC device number may be alleviated, avoiding negative impact on a conventional user. In addition, buffer overflow in an MTC device with heavy traffic due to lack of network access may be avoided, reducing a packet loss rate, improving network resource utilization, and increasing system efficiency. Traffic data integrity at a user side may be ensured, as well as allowing to somewhat reduce power consumption in repeated data generation/receiving due to buffer overflow in an MTC device.

An algorithm and display provided here is not inherently related to any specific computer, virtual system or any other device. Various universal systems may also be used together with teachings herein. According to the above illustration, a structure of such a system may be constructed with ease. In addition, the disclosure is not limited to any specific programming language. Note that various programming languages may be used to implement what disclosed herein, and the illustration of a specific language is for disclosing optimal implementation herein.

A lot of details are disclosed herein. However it can be understood that an embodiment herein may be practiced without such details. In some examples, a commonly known method structure and art may not be elaborated so as not to obscure understanding the disclosure.

Similarly, note that in order to simplify the disclosure and facilitate understanding an aspect/aspects, in the illustration of exemplary embodiments, features herein sometimes may be grouped in a single embodiment, drawing, or illustration thereof. However, a disclosed method should not be explained as reflecting that the disclosure seeking protection requires more features than that clearly prescribed in a claim. More precisely, as reflected by the claims, an aspect of the disclosure may be less than all features in a single embodiment disclosed. Thus, the claims supported by the detailed description hereby are clearly incorporated in the detailed description. Each claim per se may serve as an embodiment herein.

Those skilled in the art may understand that modules in a device herein may be changed adaptively and set in one or more devices other than said device. Modules, units, or components herein may be combined as one module/unit/component, or each may be divided into sub-modules/sub-units/sub-components. Any combination of all features and all processes or units of any method or device disclosed herein (including accompanying claims, abstract and drawings) may be possible, unless at least some of such features, processes and/or units are mutually exclusive. Unless expressly stated otherwise, each feature disclosed herein (including accompanying claims, abstract and drawings) may be replaced by a substitutional feature with an identical, equivalent, or similar purpose.

In addition, those skilled in the art may understand that although some embodiments herein may include some feature included in other embodiments instead of other features, combinations of features of different embodiments also fall within the range of the disclosure and form different embodiments. For example, in the claims, any claimed embodiment may be used in an arbitrary combination.

An embodiment of a part herein may be implemented as hardware, software modules run on one or more processors, or a combination thereof. Those skilled in the art may understand that in practice, some or all functions of some or all parts of an apparatus for accessing a mobile communication system by an MTC device according to an embodiment herein may be implemented using a microprocessor or a Digital Signal Processor (DSP). The disclosure may be further implemented as a device or apparatus program (such as a computer program and a computer program product) for executing part or all of the method illustrated here. Such a program implementing the disclosure may be stored in a computer-readable medium, or may be in form of one or more signals. Such a signal may be downloaded from an internet site or provided on a carrier signal, or provided in any other form.

Note that the embodiments are for illustrating the disclosure instead of limiting the disclosure. Those skilled in the art may design an alternative embodiment without departing from the range of the claims. In a claim, any reference numeral between parentheses should not be construed as limiting the claim. A term "include/comprise" does not exclude existence of an element or step not listed in a claim. A term "a" or "one" in front of an element does not exclude existence of multiple such elements. The disclosure may be implemented with a properly programmed computer and hardware including different elements. In a unit claim listing a number of apparatuses, a number of such apparatuses may be implemented through one hardware item. Use of a term "first", "second", "third" and the like denotes no specific order. Such a term may be explained as a name.

What described are merely embodiments of the disclosure, and are not intended to limit the scope of the present disclosure.

INDUSTRIAL APPLICABILITY

With an embodiment herein, an MTC device may decide whether to initiate an access process by computing a local traffic buffer state, and comparing the local traffic buffer state with a queue limiting factor (also known as a buffer state parameter) acquired from a broadcast channel, avoiding packet loss caused by buffer overflow in an MTC device with heavy traffic due to lack of network access in related art, such that access network congestion caused by an excessively large MTC device number may be alleviated, avoiding negative impact on a conventional user.

The invention claimed is:

1. A method for accessing a mobile communication system by a Machine-Type Communication (MTC) device, comprising;

after an access network element (NE) acquires a queue limiting factor, acquiring, by an MTC device of a common access level, a queue limiting factor corresponding to the common access level by monitoring a broadcast channel;

computing, by the MTC device, a local buffer queue length; determining, according to the computed local buffer queue length and the acquired queue limiting factor, whether extended access barring (EAB) can be performed; when EAB cannot be performed, continuing to acquire the queue limiting factor corresponding to the common access level by monitoring the broadcast channel; when EAB can be performed, executing the EAB, and determining, according to a result of executing the EAB, whether to initiate mobile communication system random access.

2. The method according to claim 1, wherein the access NE acquires the queue limiting factor by;

acquiring, by an MTC server from an MTC application side, buffer information of any MTC device at the MTC application side;

notifying, by the MTC server, the access NE of any acquired buffer information;

computing, by the access NE according to the any acquired buffer information, average traffic per MTC device corresponding to a common access level; and acquiring, according to the average traffic, a queue limiting factor corresponding to the common access level; and including, by the access NE, the queue limiting factor corresponding to a common access level in an EAB System Information Block (SIB), and broadcasting the EAB SIB.

3. The method according to claim 1, wherein the acquiring, by an MTC device of a common access level, a queue limiting factor corresponding to the common access level by monitoring a broadcast channel comprises;

monitoring, by the MTC device, the broadcast channel; and acquiring the queue limiting factor corresponding to the preset common access level from an EAB System Information Block (SIB) of the broadcast channel.

4. The method according to claim 2, wherein the buffer information comprises: a length of a queue of to-be-sent data traffic in a buffer of an MTC device at the MTC application side, an average buffer length per MTC device corresponding to the MTC application side, and a number of all MTC devices at the MTC application side.

5. The method according to claim 2, wherein the computing, by the access NE according to the any acquired buffer information, average traffic per MTC device corresponding to a common access level comprises:

computing, according to a formula 1, the average traffic per MTC device corresponding to a common access level as $$\frac{SumQueue}{Num \times BufferLength},\quad \text{formula 1}$$

wherein the SumQueue is a sum over lengths of queues of to-be-sent data traffic in buffers of all MTC devices of an access level, the Num is an MTC device number corresponding to the access level, and the BufferLength is an average buffer length per MTC device corresponding to the access level.

6. The method according to claim 5, wherein the acquiring, according to the average traffic, a queue limiting factor corresponding to the common access level comprises:

determining a percent range corresponding to the average traffic;

searching a preset traffic buffer parameter set for an integer corresponding to the percent range, and setting the found integer as the queue limiting factor corresponding to the common access level, wherein the traffic buffer parameter set comprises a correspondence between a percent range of a buffer length occupied by the queue of to-be-sent data traffic in the buffer of an MTC device and a preset integer.

7. The method according to claim 1, wherein the determining, according to the computed local buffer queue length and the acquired queue limiting factor, whether extended access barring (EAB) can be performed comprises:

updating, by the MTC device, the queue limiting factor by subtracting a locally saved buffered Queue Access Control Reject Number (QACRN) from the acquired queue limiting factor;

computing, by the MTC device, a ratio of the local buffer queue length to a buffer length, and selecting, from a preset traffic buffer parameter set, an integer a corresponding to the ratio, wherein the traffic buffer parameter set comprises a correspondence between a percent range of a buffer length occupied by the queue of to-be-sent data traffic in the buffer of an MTC device and a preset integer; and comparing, by the MTC device, the integer a with the updated queue limiting factor; when the integer a is less than or equal to the updated queue limiting factor, computing an absolute difference δ between the updated queue limiting factor and the integer a, computing a waiting time according to f(δ) increasing the locally saved QACRN by 1 upon expiration of the waiting time, and again acquiring a queue limiting factor corresponding to a common access level by monitoring a broadcast channel; when the integer a is greater than the updated queue limiting factor, executing the EAB, wherein the f(δ) is configured for: obtaining the waiting time of the MTC device.

8. The method according to claim 1, wherein the executing the EAB, and determining, according to a result of executing the EAB, whether to initiate mobile communication system random access comprises:

clearing, by the MTC device, a locally saved Queue Access Control Reject Number (QACRN), and acquiring, from an EAB System Information Block (SIB) of the broadcast channel, a parameter p, 0<p<1;

randomly generating, by the MTC device, a parameter q, 0<q<1, and comparing the parameter q with the acquired parameter p; when q<p, initiating the mobile communication system random access; otherwise when q>p, prohibiting the MTC device from initiating the mobile communication system random access, and upon expiration of a preset time, continuing to clear the locally saved QACRN and to acquire, from the EAB SIB of the broadcast channel, the parameter p.

9. The method according to claim 6, wherein the correspondence between a percent range of the buffer length occupied by the queue of to-be-sent data traffic in the buffer of an MTC device and a preset integer in the traffic buffer parameter set is: [0%, 10%) corresponding to an integer 0, [10%, 20%) corresponding to an integer 1, [20%, 30%) corresponding to an integer 2, [30%, 40%) corresponding to an integer 3, [40%, 50%) corresponding to an integer 4, [50%, 60%) corresponding to an integer 5, [60%, 70%) corresponding to an integer 6, [70%, 80%) corresponding to an integer 7, [80%, 90%) corresponding to an integer 8, and [90%, 100%] corresponding to an integer 9.

10. The method according to claim 9, wherein the traffic buffer parameter set is set in the access NE and an MTC device.

11. The method according to claim 2, further comprising: upon updating of the EAB SIB, acquiring the buffer information again.

12. An apparatus for accessing a mobile communication system by a Machine-Type Communication (MTC) device, comprising:

at least one hardware processor;
a non-transitory computer-readable medium storing computer readable instructions, the instructions being executable by the at least one hardware processor for:
after an access network element (NE) acquires a queue limiting factor, acquiring a queue limiting factor corresponding to a common access level by monitoring a broadcast channel; and
computing a local buffer queue length; determining, according to the computed local buffer queue length and the acquired queue limiting factor, whether extended access barring (EAB) can be performed; when EAB cannot be performed, continuing to acquire the queue limiting factor corresponding to the common access level by monitoring the broadcast channel; when EAB can be performed, executing the EAB, and determining, according to a result of executing the EAB, whether to initiate mobile communication system random access.

13. The apparatus according to claim 12, wherein the queue limiting factor is acquired by:

acquiring, by an MTC server from an MTC application side, buffer information of any MTC device at the MTC application side;
notifying, by the MTC server, the access NE of any acquired buffer information;
computing, by the access NE according to the any acquired buffer information, average traffic per MTC device corresponding to a common access level; and
acquiring, according to the average traffic, a queue limiting factor corresponding to the common access level,
wherein
the access NE includes the queue limiting factor corresponding to a common access level in an EAB System Information Block (SIB), and broadcasts the EAB SIB.

14. The apparatus according to claim 12, wherein the acquiring a queue limiting factor corresponding to a common access level by monitoring a broadcast channel comprises:

monitoring the broadcast channel; and acquiring the queue limiting factor corresponding to the preset common access level from an EAB System Information Block (SIB) of the broadcast channel.

15. The apparatus according to claim 13, wherein the buffer information comprises: a length of a queue of to-be-sent data traffic in a buffer of an MTC device at the MTC application side, an average buffer length per MTC device corresponding to the MTC application side, and a number of all MTC devices at the MTC application side.

16. The apparatus according to claim 13, wherein the computing, by the access NE according to the any acquired buffer information, average traffic per MTC device corresponding to a common access level comprises: computing, according to a formula 1, the average traffic per MTC device corresponding to a common access level as $$\frac{SumQueue}{Num \times BufferLength}, \qquad \text{formula 1}$$

wherein the SumQueue is a sum over lengths of queues of to-be-sent data traffic in buffers of all MTC devices of an access level, the Num is an MTC device number corresponding to the access level, and the BufferLength is an average buffer length per MTC device corresponding to the access level.

17. The apparatus according to claim 16, wherein the acquiring, according to the average traffic, a queue limiting factor corresponding to the common access level comprises: determining a percent range corresponding to the average traffic; searching a preset traffic buffer parameter set for an integer corresponding to the percent range, and setting the found integer as the queue limiting factor corresponding to the common access level, wherein the traffic buffer parameter set comprises a correspondence between a percent range of a buffer length occupied by the queue of to-be-sent data traffic in the buffer of an MTC device and a preset integer.

18. The apparatus according to claim 12, wherein the determining, according to the computed local buffer queue length and the acquired queue limiting factor, whether extended access barring (EAB) can be performed comprises:
updating the queue limiting factor by subtracting a locally saved buffered Queue Access Control Reject Number (QACRN) from the acquired queue limiting factor; computing a ratio of the local buffer queue length to a buffer length, and selecting, from a preset traffic buffer parameter set, an integer a corresponding to the ratio, wherein the traffic buffer parameter set comprises a correspondence between a percent range of a buffer length occupied by the queue of to-be-sent data traffic in the buffer of an MTC device and a preset integer; comparing the integer a with the updated queue limiting factor; when the integer a is less than or equal to the updated queue limiting factor, computing an absolute differences $\delta$ between the updated queue limiting factor and the integer a, computing a waiting time according to $f(\delta)$, increasing the locally saved QACRN by 1 upon expiration of the waiting time, and again acquiring a queue limiting factor corresponding to a common access level by monitoring a broadcast channel; when the integer a is greater than the updated queue limiting factor, executing the EAB, wherein the $f(\delta)$ is configured for: obtaining the waiting time of the MTC device.

19. The apparatus according to claim 12, wherein the executing the EAB, and determining, according to a result of executing the EAB, whether to initiate mobile communication system random access comprises:
clearing a locally saved Queue Access Control Reject Number (QACRN), and acquiring, from an EAB System Information Block (SIB) of the broadcast channel, a parameter p, $0<p<1$; randomly generating a parameter q, $0<q<1$, and comparing the parameter q with the acquired parameter p; when $q<p$, initiating the mobile communication system random access; otherwise when $q>p$, prohibiting the MTC device from initiating the mobile communication system random access, and upon expiration of a preset time, continuing to clear the locally saved QACRN and to acquire, from the EAB SIB of the broadcast channel, the parameter p.

20. The apparatus according to claim 17, wherein the correspondence between a percent range of the buffer length occupied by the queue of to-be-sent data traffic in the buffer of an MTC device and a preset integer in the traffic buffer parameter set is [0%, 10%) corresponding to an integer 0, [10%, 20%) corresponding to an integer 1, [20%, 30%) corresponding to an integer 2, [30%, 40%) corresponding to an integer 3, [40%, 50%) corresponding to an integer 4, [50%, 60%) corresponding to an integer 5, [60%, 70%) corresponding to an integer 6, [70%, 80%) corresponding to an integer 7, [80%, 90%) corresponding to an integer 8, and [90%, 100%] corresponding to an integer 9.

\* \* \* \* \*